United States Patent
Kong et al.

(10) Patent No.: US 11,810,265 B2
(45) Date of Patent: Nov. 7, 2023

(54) IMAGE RECONSTRUCTION METHOD AND DEVICE, APPARATUS, AND NON-TRANSITORY COMPUTER-READABLE STORAGE MEDIUM

(71) Applicant: SANECHIPS TECHNOLOGY CO., LTD., Shenzhen (CN)

(72) Inventors: Dehui Kong, Shenzhen (CN); Ke Xu, Shenzhen (CN); Xiao Zhang, Shenzhen (CN); Bin Han, Shenzhen (CN); Zhou Han, Shenzhen (CN); Hong Wang, Shenzhen (CN); Guoning Lu, Shenzhen (GD); Long Huang, Shenzhen (CN); Sheng Luo, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 260 days.

(21) Appl. No.: 17/299,557

(22) PCT Filed: Dec. 20, 2019

(86) PCT No.: PCT/CN2019/126859
§ 371 (c)(1),
(2) Date: Jun. 3, 2021

(87) PCT Pub. No.: WO2020/125740
PCT Pub. Date: Jun. 25, 2020

(65) Prior Publication Data
US 2022/0036506 A1    Feb. 3, 2022

(30) Foreign Application Priority Data
Dec. 20, 2018  (CN) .......................... 201811565875.0

(51) Int. Cl.
G06T 3/40    (2006.01)
G06T 5/50    (2006.01)
G06F 18/25   (2023.01)

(52) U.S. Cl.
CPC .......... G06T 3/4007 (2013.01); G06F 18/251 (2023.01); G06T 5/50 (2013.01);
(Continued)

(58) Field of Classification Search
None
See application file for complete search history.

(56) References Cited

U.S. PATENT DOCUMENTS

2010/0246751 A1    9/2010  Bruder et al.
2013/0279781 A1   10/2013  Ding et al.
(Continued)

FOREIGN PATENT DOCUMENTS

CN    106846463 A    6/2017
CN    107240066 A   10/2017
(Continued)

OTHER PUBLICATIONS

Wei Wang, Liqiang Zhu, "Reliable Identification of Redundant Kernels for Convolutional Neural Network Compression", arXiv:1812.03608v1, https://doi.org/10.48550/arXiv.1812.03608 Dec. 10, (Year: 2018).*
(Continued)

*Primary Examiner* — Jiangeng Sun
(74) *Attorney, Agent, or Firm* — Vivacqua Crane, PLLC (57) ABSTRACT

An image reconstruction method, device and apparatus and non-transitory computer-readable storage medium are disclosed. The method may include: determining norms of convolution kernels of each convolutional layer of a deep neural network model; determining the convolution kernels with norms greater than or equal to a preset threshold in each
(Continued)

convolutional layer to obtain a target convolution kernel set of each convolutional layer; processing an input image of each convolutional layer by using the convolution kernels in the target convolution kernel set of each convolutional layer respectively, to obtain a first image processing result; obtaining a second image processing result by performing interpolation on an initial image; and determining a fusion result according to the first image processing result and the second image processing result and reconstructing the initial image according to the fusion result.

13 Claims, 4 Drawing Sheets

(52) U.S. Cl.
CPC .............. *G06T 2207/20081* (2013.01); *G06T 2207/20084* (2013.01)

(56) References Cited

U.S. PATENT DOCUMENTS

| | | | | |
|---|---|---|---|---|
| 2018/0130236 A1* | 5/2018 | He | .................... | G01R 33/5659 |
| 2018/0211157 A1 | 7/2018 | Liu et al. | | |
| 2018/0349771 A1 | 12/2018 | Kamilov et al. | | |
| 2019/0045168 A1* | 2/2019 | Chaudhuri | ........... | H04N 13/139 |

FOREIGN PATENT DOCUMENTS

| | | | | |
|---|---|---|---|---|
| CN | 107358575 A | * | 11/2017 | ........... G06T 3/4046 |
| CN | 107358575 A | | 11/2017 | |
| CN | 107944555 A | | 4/2018 | |
| CN | 108898168 A | | 11/2018 | |
| CN | 108921783 A | | 11/2018 | |
| EP | 3319039 A1 | | 5/2018 | |
| WO | 2017223560 A1 | | 12/2017 | |

OTHER PUBLICATIONS

Zhuang Liu1, Jianguo Li, Zhiqiang Shen, Gao Huang, Shoumeng Yan, Changshui Zhang, "Learning Efficient Convolutional Networks through Network Slimming", arXiv:1708.06519v1 [cs.CV] Aug. 22, 2017.*

Hao Li, Asim Kadav, Igor Durdanovic, Hanan Samet,Hans Peter Graf, "Pruning Filters for Efficient Convnets", arXiv: 1608.08710v3 [cs.CV] Mar. 10, 2017.*

International Search Report and Written Opinion for the International Patent Application No. PCT/CN2019/126859 dated Mar. 9, 2020.

Li, H., et al. "Pruning Filters for Efficient ConvNets," 5th International Conference on Learning Representations (ICLR), 2017, pp. 1-13.

The State Intellectual Property Office of People's Republic of China. First Office Action for CN Application No. 2018115658750 and English translation, dated Aug. 14, 2023, pp. 1-16.

The State Intellectual Property Office of People's Republic of China. First Search Report for CN Application No. 2018115658750 and English translation, dated Aug. 9, 2023, pp. 1-6.

Zhang, S., et al. "Super-resolution reconstruction based on convolutional neural network," Computer Engineering and Design, vol. 38, No. 11, 2017, pp. 3080-3086.

* cited by examiner

IMAGE RECONSTRUCTION METHOD AND DEVICE, APPARATUS, AND NON-TRANSITORY COMPUTER-READABLE STORAGE MEDIUM

CROSS-REFERENCE TO RELATED APPLICATION

This application is a national stage filing under 35 U.S.C. § 371 of international application number PCT/CN2019/126859, filed Dec. 20, 2019, which claims priority to Chinese patent application No. 201811565875.0, filed Dec. 20, 2018. The contents of these applications are incorporated herein by reference in their entirety.

TECHNICAL FIELD

The present disclosure relates to the technical field of computer vision, and in particular to an image reconstruction method, device and apparatus and a non-transitory computer-readable storage medium.

BACKGROUND

In existing technology, conventional super-resolution reconstruction methods are interpolation based on a spatial position or edge. The conventional super-resolution reconstruction methods only consider the texture information of the spatial position or edge of an image rather than structural information such as the image feature, leading to a decrease in definition or the phenomenon of "aliasing" during image reconstruction.

Super-resolution reconstruction methods based on a deep neural network can effectively overcome the aforementioned defect. However, the super-resolution reconstruction methods based on the deep neural network consumes more resources than the conventional super-resolution reconstruction methods, and there exists the problem of instability with the deep neural network.

SUMMARY

In view of above issues, embodiments of the present disclosure provide an image reconstruction method, device, apparatus and non-transitory computer-readable storage medium.

An embodiment of the present disclosure provides an image reconstruction method, may including: determining norms of convolution kernels of each convolutional layer of a deep neural network model; determining the convolution kernels with norms greater than or equal to a preset threshold in each convolutional layer to obtain a target convolution kernel set of each convolutional layer, where the target convolution kernel set of each convolutional layer comprises the convolution kernels with norms greater than or equal to the preset threshold; processing an input image of each convolutional layer by using the convolution kernels in the target convolution kernel set of each convolutional layer respectively, to obtain a first image processing result for the deep neural network model; obtaining a second image processing result by performing interpolation on the initial image; and determining a fusion result according to the first image processing result and the second image processing result and reconstructing the initial image according to the fusion result.

An embodiment of the present disclosure provides an image reconstruction device, may including: a first determination module, configured to determine norms of convolution kernels of each convolutional layer of a deep neural network model; a second determination module, configured to determine the convolution kernels with norms greater than or equal to a preset threshold in each convolutional layer to obtain a target convolution kernel set of each convolutional layer, where the target convolution kernel set of each convolutional layer comprises the convolution kernels with norms greater than or equal to the preset threshold; a processing module, configured to process an input image of each convolutional layer by using the convolution kernels in the target convolution kernel set of each convolutional layer respectively, to obtain a first image processing result for the deep neural network model; an acquisition module, configured to obtain a second image processing result by performing interpolation on the initial image; and a third determination module, configured to determine a fusion result according to the first image processing result and the second image processing result to reconstruct the initial image according to the fusion result.

An embodiment of the present disclosure provides an image reconstruction apparatus, may including a processor and a memory storing a computer program, where the computer program, when executed by the processor, causes the processor to perform the steps in the above image reconstruction method.

An embodiment of the present disclosure provides a non-transitory computer-readable storage medium storing a computer program which, when executed by a processor, causes the processor to perform the steps in the above image reconstruction method.

With the image reconstruction method, device, apparatus and non-transitory computer-readable storage medium provided by the embodiments of the present disclosure, the resource consumption of a deep neural network at the inference end can be reduced, and the stability of a processing result can be increased.

DETAILED DESCRIPTION

The present disclosure will be illustrated in detail below in conjunction with the accompanying drawings and embodiments.

Figure 1:
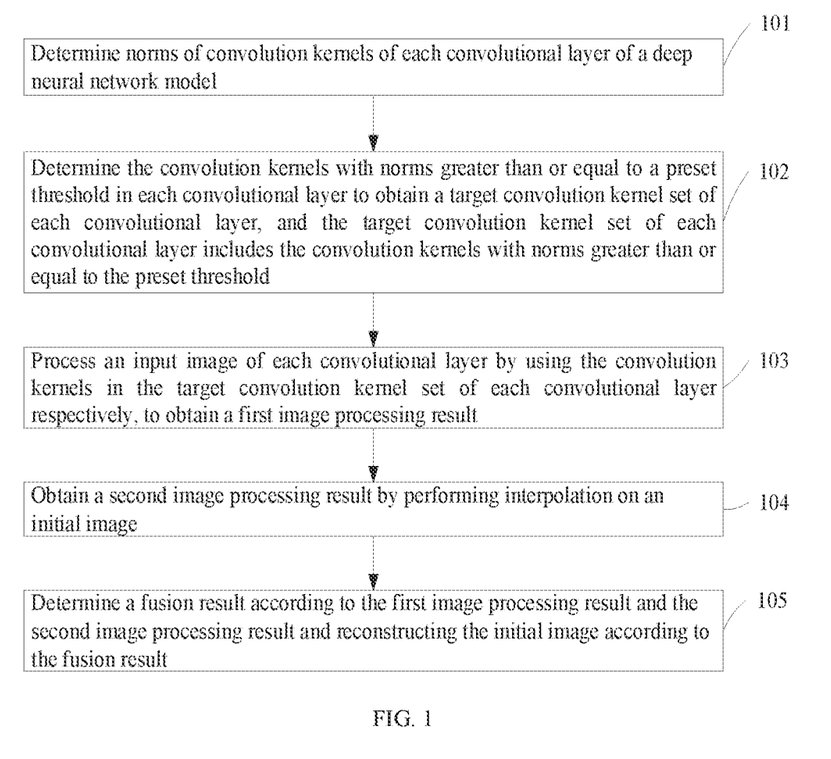
FIG. 1 is a first schematic flowchart for implementation of an image reconstruction method in an embodiment of the present disclosure.

FIG. 1 is a first schematic flowchart for implementation of an image reconstruction method in an embodiment of the present disclosure. As shown in FIG. 1, the method includes the following steps S101 to S105.

At step S101, a norm of a convolution kernel of each convolutional layer of a deep neural network model is determined.

The deep neural network model includes at least one convolutional layer, each convolutional layer includes at least one convolution kernel, and a norm of the convolution kernel of each convolutional layer of the deep neural network model is determined. Here, the convolution kernel may be a vector or a matrix.

In some embodiments, an L1 norm or L2 norm of each convolution kernel of each convolutional layer may be used in determination of a norm of the convolution kernel.

At step S102, the convolution kernels with norms greater than or equal to a preset threshold in each convolutional layer are determined to obtain a target convolution kernel set of each convolutional layer, and the target convolution kernel set of each convolutional layer includes the convolution kernels with norms greater than or equal to the preset threshold.

After being determined, the norms of the convolution kernels of each convolutional layer are compared with the preset threshold to determine the convolution kernels with the norm greater than or equal to the preset threshold in each convolutional layer, and the convolution kernels are taken as a target convolution kernel set of each convolutional layer.

In some embodiments, the preset threshold may be set according to norms of the convolution kernels of each convolutional layer.

For example, if there is a great difference between a maximum norm and a minimum norm of the convolution kernels of each convolutional layer, the preset threshold may be set as a value approximating the maximum norm, and then an input image of each convolutional layer can be processed with the maximum norm of the convolution kernels of each convolutional layer.

At step S103, the input image of each convolutional layer is processed using the convolution kernels in the target convolution kernel set of each convolutional layer, to obtain a first image processing result for the deep neural network model.

The input image of each convolutional layer is processed using the convolution kernels in the target convolution kernel set of each convolutional layer.

In some embodiments, the deep neural network model includes a plurality of convolutional layers. The input image of a first convolutional layer is processed using the convolution kernels in the target convolution kernel set of the first convolutional layer; with the aforementioned processing result as an input image of a second convolutional layer, the input image of the second convolutional layer is processed using the convolution kernels in the target convolution kernel set of the second convolutional layer; and this operation is repeated until the input image of the last convolutional layer is processed using the convolution kernels in the target convolution kernel set of the last convolutional layer, to obtain a first image processing result for the deep neural network model.

Here, the first image processing result may be an image processing result of the deep neural network model.

At step S104, a second image processing result is obtained by performing interpolation on the initial image.

Here, the second image processing result is an image processing result of a conventional interpolation method.

A conventional interpolation method may be used in the interpolation on the initial image. The conventional interpolation method may be Bicubic interpolation or Lanczos interpolation.

The result obtained by processing the initial image by the conventional interpolation method is taken as a second image processing result.

At step S105, a fusion result is determined according to the first image processing result and the second image processing result, and the initial image is reconstructed according to the fusion result.

A fusion result is determined according to the obtained first image processing result and second image processing result, and the initial image is reconstructed according to the fusion result.

In some embodiments of the present disclosure, the initial image may be a low-resolution image, and the initial image can be reconstructed to a high-resolution image by the image reconstruction method.

In some embodiments of the present disclosure, the initial image may be used as an input image of the first convolutional layer of the deep neural network model.

In an embodiment of the present disclosure, norms of the convolution kernels of each convolutional layer of the deep neural network model are determined, the convolution kernels with norms greater than or equal to the preset threshold in each convolutional layer are determined to obtain a target convolution kernel set of each convolutional layer, and the input image of each convolutional layer is processed using the convolution kernels in the target convolution kernel set of each convolutional layer, to obtain a first image processing result for the deep neural network model. A second image processing result is obtained by performing interpolation on the initial image. A fusion result is determined according to the first image processing result and the second image processing result, and the initial image is reconstructed according to the fusion result. In this way, the resource consumption of a deep neural network at the inference end can be reduced, and the stability of a processing result can be increased.

An embodiment of the present disclosure provides an image reconstruction method. The method includes the following steps S201 to S205.

At step S201, norms of convolution kernels of each convolutional layer of a deep neural network model are determined.

At step S202, the convolution kernels with norms greater than or equal to a preset threshold in each convolutional layer are determined to obtain a target convolution kernel set of each convolutional layer, and the target convolution kernel set of each convolutional layer includes the convolution kernels with norms greater than or equal to the preset threshold.

At step S203, an input image of each convolutional layer is processed using the convolution kernels in the target convolution kernel set of each convolutional layer, to obtain a first image processing result for the deep neural network model.

In some embodiments, if the difference between the maximum norm and minimum norm of the convolution kernels in the target convolution kernel set of each convolutional layer is within a preset range, the input image is processed using the convolution kernels with norms greater than or equal to the preset threshold.

For example, the norms of the convolution kernels in the target convolution kernel set of one convolutional layer are respectively 10, 8, 7, 6 and 3; the difference between the maximum norm (i.e. 10) and the minimum norm (i.e. 3) is 7, the preset range is 9, so the difference between the maximum norm and the minimum norm is within the preset range; and if the preset threshold is 8, the input image is processed using the convolution kernels with norms of 8 and 10.

Here, the preset range may be determined according to the requirement of a user.

In some embodiments, if the difference between the maximum norm and minimum norm of the convolution kernels in the target convolution kernel set of each convolutional layer is not within the preset range, the convolution kernels are sorted in a descending order of the norms, and the input image is processed using the first M convolution kernels in a sorting result, where M is a natural number greater than or equal to 1.

If the difference between the maximum norm and minimum norm of the convolution kernels in the target convolution kernel set of each convolutional layer is not within the preset range, the norms may be sorted in a descending order, and the input image is processed using the first M convolution kernels, where M may be set according to the requirement of the user.

At step S204, a second image processing result is obtained by performing interpolation on the initial image.

At step S205, a fusion result is determined according to the first image processing result and the second image processing result, and the initial image is reconstructed according to the fusion result.

By adopting the scheme in the embodiment of the present disclosure, convolution kernels can be chosen according to norms of the convolution kernels of each convolutional layer, and an input image of each convolutional layer can be processed using the chosen convolution kernels.

An embodiment of the present disclosure provides an image reconstruction method. The method includes the following steps S301 to S307.

At step S301, norms of convolution kernels of each convolutional layer of a deep neural network model are determined.

The deep neural network model includes N convolutional layers.

At step S302, norms of convolution kernels of an $i^{th}$ convolutional layer among the N convolutional layers are compared with a preset threshold to determine the convolution kernels with norms greater than or equal to the preset threshold in the $i^{th}$ convolutional layer, so that a first target convolution kernel subset of the $i^{th}$ convolutional layer is obtained.

i is a natural number greater than 1 and less than N. Here, the $i^{th}$ convolutional layer may be any convolutional layer except the last convolutional layer.

The norms of the convolution kernels of the $i^{th}$ convolutional layer are compared with the preset threshold, so that the convolution kernels with norms greater than or equal to the preset threshold in the $i^{th}$ convolutional layer can be obtained, which are taken as a first target convolution kernel subset of the $i^{th}$ convolutional layer.

At step S303, norms of convolution kernels of an $(i+1)^{th}$ convolutional layer among the N convolutional layers are compared with a preset threshold to determine the convolution kernels with norms greater than or equal to the preset threshold in the $(i+1)^{th}$ convolutional layer, so that a second target convolution kernel subset of the $(i+1)^{th}$ convolutional layer is obtained.

The $(i+1)^{th}$ convolutional layer represents a next convolutional layer to the $i^{th}$ convolutional layer. Here, the $(i+1)^{th}$ convolutional layer may be the last convolutional layer.

The norms of the convolution kernels of the $(i+1)^{th}$ convolutional layer are compared with the preset threshold, so that the convolution kernels with norms greater than or equal to the preset threshold in the $(i+1)^{th}$ convolutional layer can be obtained, which are taken as the second target convolution kernel subset of the $(i+1)^{th}$ convolutional layer.

At step S304, an input image of the $i^{th}$ convolutional layer is processed using the first target convolution kernel subset to obtain an image processing result of the $i^{th}$ convolutional layer, and an image processing result of the $i^{th}$ convolutional layer is taken as an input image of the $(i+1)^{th}$ convolutional layer.

The input image of the $i^{th}$ convolutional layer is processed using the first target convolution kernel subset of the $i^{th}$ convolutional layer to obtain an image processing result of the $i^{th}$ convolutional layer. Here, the image processing result of the $i^{th}$ convolutional layer represents an image processing result of any convolutional layer except the last convolutional layer.

The image processing result of the $i^{th}$ convolutional layer is taken as an input image of a next convolutional layer (i.e. the $(i+1)^{th}$ convolutional layer) to the $i^{th}$ convolutional layer.

At step S305, the input image of the $(i+1)^{th}$ convolutional layer is processed using the second target convolution kernel subset to obtain an image processing result of the $(i+1)^{th}$ convolutional layer. When i+1=N, the image processing result of the $N^{th}$ convolutional layer is taken as a first image processing result.

The input image of the $(i+1)^{th}$ convolutional layer is processed using the second target convolution kernel subset of the $(i+1)^{th}$ convolutional layer to obtain an image processing result of the $(i+1)^{th}$ convolutional layer. Here, the image processing result of the $(i+1)^{th}$ convolutional layer represents an image processing result of a convolutional layer including the last convolutional layer.

When i+1=N, the image processing result of the $(i+1)^{th}$ convolutional layer is taken as the first image processing result.

At step S306, a second image processing result is obtained by performing interpolation on the initial image.

At step S307, a fusion result is determined according to the first image processing result and the second image processing result, and the initial image is reconstructed according to the fusion result.

By adopting the scheme in the embodiment of the present disclosure, the convolution kernels with norms greater than or equal to the threshold in each convolutional layer of the deep neural network model can be determined, and the input image of each convolutional layer is processed according to the determined convolution kernels to obtain the first image processing result.

An embodiment of the present disclosure provides an image reconstruction method. The method includes the following steps S401 to S406.

At step S401, norms of convolution kernels of each convolutional layer of a deep neural network model are determined.

At step S402, the convolution kernels with norms greater than or equal to a preset threshold of each convolutional layer are determined to obtain a target convolution kernel set of each convolutional layer, and the target convolution kernel set of each convolutional layer includes the convolution kernels with norms greater than or equal to the preset threshold.

At step S403, an input image of each convolutional layer is processed using the convolution kernels in the target convolution kernel set of each convolutional layer, to obtain a first image processing result for the deep neural network model.

At step S404, a second image processing result is obtained by performing interpolation on the initial image.

At step S405, weights corresponding to the first image processing result and the second image processing result are determined respectively.

After the first image processing result and the second image processing result are obtained, weights corresponding to the first image processing result and the second image processing result are determined respectively.

In some embodiments, in determination of a weight corresponding to the first image processing result, the weight corresponding to the first image processing result may be determined according to a reliability coefficient of each convolutional layer.

A result of multiplying the reliability coefficients of all convolutional layers may be taken as the weight corresponding to the first image processing result, or the minimum reliability coefficient among the reliability coefficients of all convolutional layers may be taken as the weight corresponding to the first image processing result.

In some embodiments, formula (1) may be employed to determine the reliability coefficient of each convolutional layer:

$$t_i = 1 - \frac{\sum_{j=0:Q-\Omega} |f_{ij}(x)|}{\sum_{j=0:Q} |f_{ij}(x)|} \qquad \text{Formula (1)}$$

where $t_i$ represents the reliability coefficient of the $i^{th}$ convolutional layer, $|f_{ij}(x)|$ represents the norm of a $j^{th}$ convolution kernel of the $i^{th}$ convolutional layer, $\Omega$ represents the set of the convolution kernels with norms greater than or equal to the preset threshold in the $i^{th}$ convolutional layer, and Q represents the set of all the convolution kernels in the $i^{th}$ convolutional layer.

It should be noted that in the embodiment of the present disclosure, there is no limitation to methods adopted for determining a reliability coefficient of each convolutional layer.

In one embodiment, after the weight corresponding to the first image processing result is determined, a weight corresponding to the second image processing result may be obtained according to the weight corresponding to the first image processing result.

For example, if the weight corresponding to the first image processing result is A, the weight corresponding to the second image processing result may be 1-A.

At step S406, a fusion result is determined according to the first image processing result, the second image processing result, the weight corresponding to the first image processing result and the weight corresponding to the second image processing result.

Weighted summation is performed according to the first image processing result, the second image processing result, the weight corresponding to the first image processing result and the weight corresponding to the second image processing result to determine a fusion result.

By adopting the scheme in the embodiment of the present disclosure, the first image processing result and the second image processing result can be fused, and the initial image can be processed using the fusion result to increase the stability of the processing result.

An embodiment of the present disclosure provides an image reconstruction method. The method includes the following steps S501 to S508.

At step S501, any deep neural network is chosen.

Any chosen deep neural network may be a deep neural network including three convolutional layers or a deep neural network including more than three convolutional layers. It should be noted that in the present disclosure, there is no limitation of choosing deep neural networks.

At step S502, according to an input image for training and an output image for training, training parameters for the deep neural network are determined using the deep neural network.

According to the input image for training and the output image for training, training parameters of any chosen deep neural network are calculated using the deep neural network.

Here, the training parameters may include convolution kernels and a bias coefficient, the input image for training may be a low-resolution image, and the output image for training may be a high-resolution image.

At step S503, a deep neural network model is obtained according to the training parameters, the input image for training and the output image for training.

A deep neural network model can be obtained according to the determined training parameters, the input image for training and the output image for training, and the initial image can be reconstructed according to the deep neural network model.

At step S504, norms of convolution kernels of each convolutional layer of the deep neural network model are determined.

At step S505, the convolution kernels with norms greater than or equal to a preset threshold in each convolutional layer are determined to obtain a target convolution kernel set of each convolutional layer, and the target convolution kernel set of each convolutional layer includes the convolution kernels with norms greater than or equal to the preset threshold.

At step S506, an input image of each convolutional layer is processed using the convolution kernels in the target convolution kernel set of each convolutional layer, to obtain a first image processing result for the deep neural network model.

At step S507, a second image processing result is obtained by performing interpolation on the initial image.

At step S508, a fusion result is determined according to the first image processing result and the second image processing result, and the initial image is reconstructed according to the fusion result.

It should be noted that steps S501 to S503 of the embodiment of the present disclosure may be applied to a training end of the deep neural network and that steps S504 to S508 of the embodiment of the present disclosure may be applied to an inference end of the deep neural network.

The training end and the inference end may be different physical apparatuses. For example, the training end is a server end, and the inference end is a terminal. The training end and the inference end interact with each other through a network. The training end sends a deep neural network model obtained by training to the inference end via the network, and the inference end reconstructs the initial image according to the deep neural network model.

The training end and the inference end may also be a same physical apparatus. For example, a terminal serves as the training end as well as the inference end. The terminal obtains a deep neural network model by training, and the initial image is reconstructed according to the deep neural network model.

By adopting the scheme in the embodiment of the present disclosure, any deep neural network can be chosen, and training parameters for the deep neural network can be determined according to an input image for training and an output image for training to obtain a deep neural network model. In this way, there is no need to rely on the structure of a particular deep neural network, the scheme has universality and good generalization for most deep neural networks.

Super-resolution reconstruction refers to a process of converting a low-resolution image into a high-resolution image. In existing technology, common super-resolution reconstruction methods are interpolation based on a spatial position or edge. These two types of interpolations may lead to a decrease in definition or the phenomenon of "aliasing" during image reconstruction. This defect is due to, on one hand, the fact that the interpolation lacks structural information and, on the other hand, the fact that directional features as a reference for interpolation are generally derived from a statistic result, but not for interpolation points.

Deep learning is a kind of machine learning algorithm which simulates the cognition of the human brain to deal with problems in the current field of computer vision. Super-resolution reconstruction methods based on deep learning can effectively overcome the aforementioned defect. The super-resolution reconstruction methods based on deep learning depend on convolutional operation to respond to the difference between local regions, and expand a reference region in the process of layer-by-layer processing.

The super-resolution reconstruction technology based on deep learning, which is often implemented by multi-layer convolutional neural networks (CNN), can utilize the machine learning method to obtain a certain correspondence between a low-resolution image and a high-resolution image, and train a designed model based on training data which are the low-resolution version of an image as an input of the model and the high-resolution version of the image as an output of the model.

A deep neural network is divided into a training end and an inference end. With the increase of data volume and the enhancement of numerical computing capability, the layer number and structure of the deep neural network become more and more complex. It is estimated that there are 100 billion neurons in the brain of an adult. The design of convolutional layers and hidden layers of a deep neural network can fit a nonlinear high-dimensional function. Complex nonlinear separating hyperplanes in a plane can be fitted using a two-layer neural network. So far, the layer number of neural networks has been increased to the magnitude of thousands of layers from the original five layers. It can be foreseen that as the understanding of the brain model by the human being is deepened constantly and mathematic methods develop constantly, deep neural networks will show better output performance and have better information processing capability.

The training of neural networks always affected their wide application before. In 2006, Hinton proposed the "Deep Belief Network" for the first time. An excellent initial value is given to a neural network by a pre-training method, and a fine adjustment method is then employed to optimize the network. The combination of these two techniques greatly shortens the time taken to train a multi-layer network and, coupled with the current optimization of graphics processing units (GPU) in parallel computing, can effectively solve the problem on how to train a deep neural network under the condition of enough computing resources.

The difference of neural network training from conventional machine learning methods is that the parameter space of neural network training is expanded enormously. When a task which could be originally completed with only ten parameters is migrated to a deep neural network, thousands of parameters are needed, which limits the large-scale deployment of a computer vision algorithm based on the deep neural network. For example, in many cases, the inference end cannot have rich allocated computing resources like the training end. For example, the design of embedded apparatuses or application-specific integrated circuits (ASIC) designed for special purposes is very sensitive to the consumption and utilization rate of computing resources and storage space. Therefore, the reduction of computing resources and static random access memories (SRAM) plays a vital role for the popularization of algorithms.

Moreover, because the explanation of the deep learning principle is still incomplete at present, potential instability exists in deep neural networks, which is not favorable for large-scale development of deep neural networks. For example, for the design of a mobile terminal or hardware, it is not suitable to deploy a deep neural network.

Figure 2:
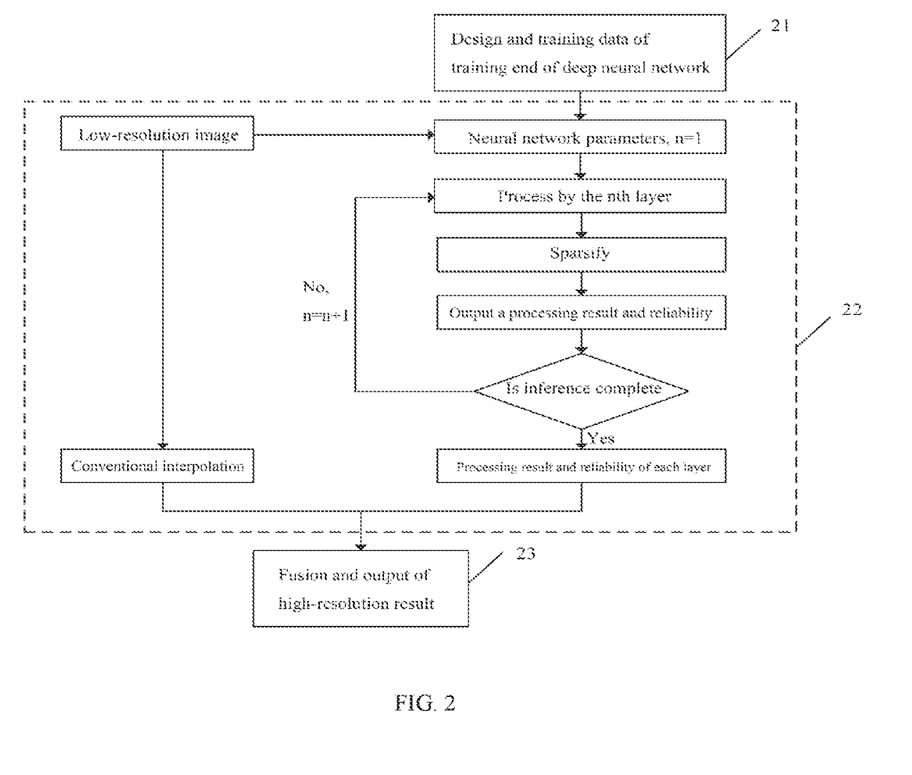
FIG. 2 is a second schematic flowchart for implementation of the image reconstruction method in an embodiment of the present disclosure.

The super-resolution reconstruction method based on a deep neural network according to the embodiment of the present disclosure includes the following three steps, as shown in FIG. 2.

Step S21: Design and Training of a Training End of a Deep Neural Network

This step mainly utilizes corresponding high-resolution and low-resolution images to constitute a training set, and training is performed under a specified deep neural network. This is the difference of the embodiment of the present disclosure from ordinary super-resolution reconstruction methods based on a deep neural network. That is, processing by the embodiment of the present disclosure does not depend on the structure of a neural network, so the embodiment of the present disclosure has universality and good generalization for most neural networks. With an increase in the depth of a neural network, such generalization is attenuated constantly. Moreover, a study shows that for a super-resolution reconstruction task, with the constant increase of the depth of the deep neural network, the effect cannot always be increased significantly, but resource consumption is increased remarkably, so an overly complex deep neural network is not recommended.

The embodiment of the present disclosure can be adapted to a variety of neural network architectures, such as most convolutional neural networks. Because the training end is off-line, the training end is not sensitive to the embodiment of the present disclosure as well.

Step S22: Adjustment and Reliability Estimation of Output Result of Each Layer

The selection of a threshold depends on convolution results.

If a strong response to one convolution kernel occurs, the threshold can be increased. That is, the other convolution kernels are suppressed, and the structural information represented by this convolution kernel is preferred. Here, the amplitude of an L2 norm or an L1 norm may be employed to represent response intensity, and a large amplitude means a strong response.

If the difference between original convolution results is relatively small, it may be considered that there is no clear structural information in this region, and the threshold can be decreased appropriately. If the responses of the convolution kernels are not obvious, most of the convolution results can be eliminated, or the first N maximum values with respect to responses may be selected to forcibly eliminate the other responses.

A sparsification can be realized on the results of the convolution kernels by the aforementioned operation to intensify the clear structural information of a region to be reconstructed and decrease the blurring effect. For the convolution kernels with a final response of 0, intermediate results may no longer be stored, and they do not participate in subsequent nonlinear processing and reconstruction, and thus resource overhead is reduced. Moreover, by comprehensively considering the proportion of the weakened responses and the intensities of the responses, the reliability of the responses of each layer of the neural network is output.

This step is mainly intended to reduce ever-increasing resource consumption as the result of the increment of layer number, and at the same time, this layer also needs to output the reliability of a sparsification result. Because of the limitation of the neural network and sparsification, it is necessary to output the reliability of convolution of each layer.

Step S23: Fusion and Output of High-Resolution Result

Because a part of the responses have been eliminated, the stability of the output result in the previous step is decreased, and moreover, there also exists a potential abnormal value if the result of the deep neural network is output directly. In this step, a scheme of fusing the output result of the deep neural network with a result of a conventional interpolation method is employed to determine a final output. By the result of step S22 of the embodiment of the present disclosure, weights between the two results are determined by the structural information of the region to be reconstructed. If the structural information is clear, the result of the deep neural network is preferred, and otherwise, the result of the conventional interpolation is preferred.

The sparsification result of step S22 and the reliability parameter are fused. Here, the fusion scheme may adopt minimum weights or multiply weights of each layer for output.

Figure 3:
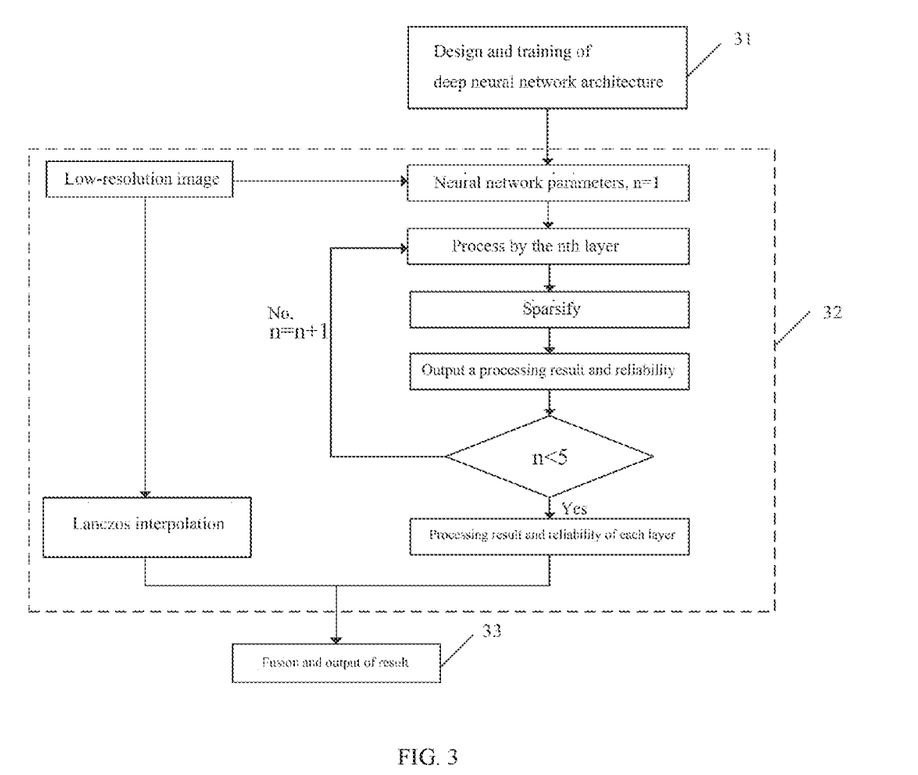
FIG. 3 is a third schematic flowchart for implementation of the image reconstruction method in an embodiment of the present disclosure.

The scheme of the embodiment of the present disclosure will be described in detail below in conjunction with an implementation flowchart, as shown in FIG. 3.

Step S31: Design and Training of Deep Neural Network Architecture

A desired deep neural network is designed according to a correspondence between image information before and after reconstruction. Since the embodiment of the present disclosure is not sensitive to neural network structures, as an example, a deep neural network which includes three convolutional layers and two nonlinear mapping layers may be adopted.

Step S32: Optimization of Inference End and Output of Reliability Information

In accordance with results from a deep neural network obtained by training in step S31, as an example for illustration, each convolutional layer includes nine convolution kernels, the first three results with the strongest responses are taken according to norms of nine convolution kernels of each convolutional layer, as shown by formula (2):

$$T_i(x) = \begin{cases} 0 & f_x(x) < f_q(x) \\ f_i(x) & f_i(x) \geq f_q(x) \end{cases}, \alpha = \underset{3}{\text{MAX}}\{f_0(x), f_1(x), \ldots f_8(x)\},$$ Formula (2)

where $f_i(x)$ is the norm of the $(i+1)^{th}$ convolution kernel among the nine convolution kernels, i ranges from 0 to 8, $f_q(x)$ is the minimum result among the three results with the strongest responses, and the norm $f_i(x)$ of the convolution kernel which is less than $f_q(x)$ is set as 0. After a previous processing, non-zero values in $T_i(x)$(target convolution kernel set) should be no less than or equal to 3, and the convolution results are then sparsified by the nonlinear mapping layer, i.e. employing formula (3):

$$F_i(y) = \max(0, W^*F_i(x)+B)$$ Formula (3), where $F_i(x)$ is an input of the nonlinear mapping layer, $F_i(y)$ is an output of the nonlinear mapping layer, B is a bias coefficient, W may include a plurality of convolution kernels, but not all the convolution kernels participate in nonlinear mapping convolutional operation for $F_i(y)$. Here, an optimization scheme proposed by the embodiment of the present disclosure may be employed, as shown by formula (4):

$$F_i(y) = \max(0, W^*F_i(x)+B), W \neq 0$$ Formula (4).

That is, nonlinear mapping is only performed for the convolution kernels with non-zero outputs. Here, because the number of the convolution kernels participating in operation is reduced significantly, by 67% in the aforementioned scheme, resource consumption is reduced remarkably, and in addition, the resource consumption of a next convolutional layer is also reduced by 67%.

This step also needs to output a reliability result of this layer. Here, an available alternative scheme is given, as shown by formula (5):

$$t_i = 1 - \frac{\sum_{j=0:8-\Omega} |f_i(x)|}{\sum_{j=0:8} |f_i(x)|},$$ Formula (5)

where $\Omega$ represents non-zero convolution kernels. It should be noted that this is not the only scheme, as long as reliability is reversely correlated with the discarded convolution results, that is, the more convolution results this layer loses, the lower the reliability of this layer is.

Step S33: Fusion and Output of Result

According to a reconstruction result of the deep neural network output at step S32 and the corresponding reliability of each convolutional layer, the result output by the deep neural network is fused with a result of a conventional interpolation, and an overall reliability result is obtained utilizing the combination of the reliability of each layer. The overall reliability result may be obtained by a calculation with formula (6):

$$T = t_0 * t_1 \ldots * t_i$$ Formula (6), where $t_i$ represents the reliability result of the $i^{th}$ layer, and because $t_i < 1$, $T < 1$. A final fusion result can be described by formula (7):

$$\text{OutputFinal} = \text{Output}DNN*T + \text{Output}Tra*(1-T)$$ Formula (7), where OutputFinal is the final output, OutputDNN is the output of the deep neural network, OutputTra is the output of the conventional method, and the conventional method may be Bicubic interpolation or Lanczos interpolation.

The embodiments of the present disclosure can achieve the following technical effects.

Firstly, the embodiments of the present disclosure support a variety of deep neural networks, without depending on a specific network structure. An effective pruning method can be chosen according to abstract levels represented by different convolutional layers of a deep neural network, thereby effectively reducing the problem of ever-increasing resource consumption caused by multiple layers and multiple groups of convolution kernels. By sparsifying convolution results, the utilization of the structural information of a reconstructed region is increased, and the definition of an output result is increased.

Secondly, the stability of output results is increased. The method of superposing a result of a deep neural network and a result of a conventional interpolation method to obtain a final output according to the embodiment of the present disclosure can increase the stability of the deep neural network. Moreover, the embodiment of the present disclosure proposes the scheme on how to allocate a weight, i.e. the reliability of a deep neural network result is judged by intensities of responses of convolution filters. If the amplitudes of responses of the convolution kernels are great, it indicates that the deep neural network accurately identifies the structural information of an input region, and then a large weight is allocated to an output of the deep neural network.

In the embodiments of the present disclosure, the architecture of a deep neural network is "pruned" to reduce the complexity and resource consumption of operation, increase stability and output an image with higher definition, so the application prospect is broad.

Figure 4:
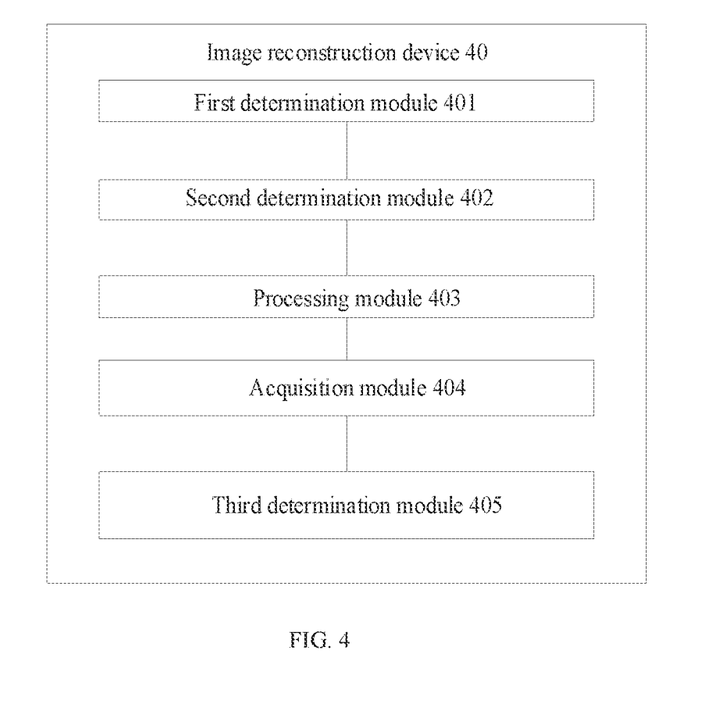
FIG. 4 is a schematic structural diagram of an image reconstruction device in an embodiment of the present disclosure.

An embodiment of the present disclosure provides an image reconstruction device. As shown in FIG. 4, the image reconstruction device 40 includes a first determination module 401, a second determination module 402, a processing module 403, an acquisition module 404, and a third determination module 405.

The first determination module 401 is configured to determine norms of convolution kernels of each convolutional layer of a deep neural network model.

The second determination module 402 is configured to determine the convolution kernels with norms greater than or equal to a preset threshold in each convolutional layer to obtain a target convolution kernel set of each convolutional layer, and the target convolution kernel set of each convolutional layer includes the convolution kernels with norms greater than or equal to the preset threshold.

The processing module 403 is configured to process an input image of each convolutional layer by using the convolution kernels in the target convolution kernel set of each convolutional layer, to obtain a first image processing result for the deep neural network model.

The acquisition module 404 is configured to obtain a second image processing result by performing interpolation on the initial image.

The third determination module 405 is configured to determine a fusion result according to the first image processing result and the second image processing result to reconstruct the initial image according to the fusion result.

In other embodiments, the processing module 403 includes a first processing unit and a second processing unit.

The first processing unit is configured to process the input image by using the convolution kernels with norms greater than or equal to the preset threshold if the difference between the maximum norm and minimum norm of the convolution kernels in the target convolution kernel set of each convolutional layer is within a preset range.

The second processing unit is configured to sort the convolution kernels in a descending order of the norms if the difference between the maximum norm and minimum norm of the convolution kernels in the target convolution kernel set of each convolutional layer is not within the preset range, and process the input image by using the first M convolution kernels in a sorting result, and M is a natural number greater than or equal to 1.

In other embodiments, the deep neural network model includes N convolutional layers, and the second determination module 402 includes a first determination unit and a second determination unit.

The first determination unit is configured to compare norms of convolution kernels of an $i^{th}$ convolutional layer among the N convolutional layers with a preset threshold to determine the convolution kernels with norms greater than or equal to the preset threshold in the $i^{th}$ convolutional layer, obtaining a first target convolution kernel subset of the $i^{th}$ convolutional layer.

The second determination unit is configured to compare norms of convolution kernels of an $(i+1)^{th}$ convolutional layer among the N convolutional layers with a preset threshold to determine the convolution kernels with norms greater than or equal to the preset threshold in the $(i+1)^{th}$ convolutional layer, obtaining a second target convolution kernel subset of the $(i+1)^{th}$ convolutional layer.

i is a natural number greater than 1 and less than N, and the i+1th convolutional layer represents the next convolutional layer to the $i^{th}$ convolutional layer.

In other embodiments, the processing module 403 includes a third processing unit and a fourth processing unit.

The third processing unit is configured to process the input image of the $i^{th}$ convolutional layer by using the first target convolution kernel subset to obtain an image processing result of the $i^{th}$ convolutional layer and take the image processing result of the $i^{th}$ convolutional layer as an input image of the $(i+1)^{th}$ convolutional layer.

The fourth processing unit is configured to process the input image of the $(i+1)^{th}$ convolutional layer by using the second target convolution kernel subset to obtain an image processing result of the $(i+1)^{th}$ convolutional layer, and take the image processing result of the $N^{th}$ convolutional layer as the first image processing result when (i+1) reaches N.

In other embodiments, the third determination module 405 includes a third determination unit and a fourth determination unit.

The third determination unit is configured to determine weights corresponding to the first image processing result and the second image processing result, respectively.

The fourth determination unit is configured to determine a fusion result according to the first image processing result, the second image processing result, the weight corresponding to the first image processing result and the weight corresponding to the second image processing result.

In other embodiments, the third determination unit includes a first determination subunit and a second determination subunit.

The first determination subunit is configured to determine the weight corresponding to the first image processing result according to a reliability coefficient of each convolutional layer.

The second determination subunit is configured to determine the weight corresponding to the second image processing result according to the weight corresponding to the first image processing result.

In other embodiments, the third determination unit also includes a third determination subunit.

The third determination subunit is configured to determine the reliability coefficient of each convolutional layer according to the formula below:

$$t_i = 1 - \frac{\sum_{j=0:Q-\Omega} |f_{ij}(x)|}{\sum_{j=0:Q} |f_{ij}(x)|}$$

where $t_i$ represents the reliability coefficient of the $i^{th}$ convolutional layer, $|f_{ij}(x)|$ represents the norm of a $j^{th}$ convolution kernel of the $i^{th}$ convolutional layer, $\Omega$ represents the set of the convolution kernels with norms greater than or equal to the preset threshold in the $i^{th}$ convolutional layer, and Q represents the set of all the convolution kernels in the $i^{th}$ convolutional layer.

It should be noted that when the image reconstruction apparatus provided in the above embodiment performs image reconstruction, only the above program modules are considered for illustration. In actual application, the above processing may be executed by different program modules as necessary, that is, the internal structure of the apparatus is divided into different program modules to complete all or part of the above-described processing. In addition, the image reconstruction apparatus provided in the above embodiment belongs to a same concept as the image reconstruction method embodiment, and the implementation process thereof is detailed in the method embodiment, and will not be repeated here.

Figure 5:
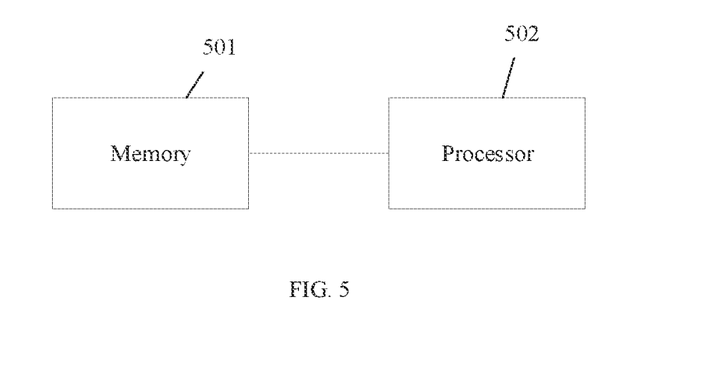
FIG. 5 is a schematic structural diagram of an image reconstruction apparatus in an embodiment of the present disclosure.

Based on the foregoing embodiments, an embodiment of the present disclosure provides an image reconstruction apparatus, may including a processor 502 and a memory 501 storing a computer program, where the computer program, when executed by the processor 502, causes the processor 502 to perform the steps in the image reconstruction method according to above embodiments.

It should be noted herein that the description of the above apparatus embodiment is similar to the description of the above method embodiments, and has same beneficial effects as the method embodiments, thus it will not be described again. For technical details not disclosed in the apparatus embodiment of the present disclosure, those having ordinary skills in the art shall refer to the description of the method embodiments of the present disclosure for understanding. To be concise, details are not described herein again.

In an exemplary embodiment, an embodiment of the present disclosure further provides a computer storage medium, which may be a non-transitory computer-readable storage medium, such as a memory 501 including a computer program, which may be processed by a processor 502 to complete the steps of the foregoing method. The non-transitory computer-readable storage medium may be FRAM, ROMs, PROMs, EPROMs, EEPROMs, Flash Memory, magnetic surface memories, optical discs, or memories such as CD-ROM.

An embodiment of the present disclosure further provides a non-transitory computer-readable storage medium on which a computer program is stored, the computer program being processed by a processor to implement the steps in the image reconstruction method provided in the foregoing embodiment.

It should be noted herein that the description of the above computer medium embodiment is similar to the description of the above method embodiments, and has same beneficial effects as that of the method embodiments. Therefore, details are not described herein again. For technical details not disclosed in the apparatus embodiments of the present disclosure, those having ordinary skills in the art shall refer to the description of the method embodiments of the present disclosure for understanding. To be concise, details are not described herein again.

The method disclosed in the above embodiments of the present disclosure may be applied to or implemented by the processor. The processor may be an integrated circuit chip having signal processing capability. In implementation, each step of the above method may be accomplished by an integrated logic circuit of hardware in the processor or instructions in the form of software. The processor described above may be a general purpose processor, a DSP, or other programmable logic device, discrete gate or transistor logic device, discrete hardware component, or the like. The processor may implement or perform each of the methods, steps, and logical block diagrams disclosed in the embodiments of the present disclosure. The general purpose processor may be a microprocessor or any conventional processor or the like. The steps of the method disclosed in connection with the embodiments of the present disclosure may be directly performed by a hardware decoding processor, or performed by a combination of hardware and software modules in the decoding processor. The software module may be located in a storage medium located in a memory, and the processor reads information in the memory and completes the steps of the foregoing method in combination with its hardware.

It will be understood that the memory (storage) of the embodiment of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disc, or an compact disc read-only memory (CD-ROM), and the magnetic surface memory may be a magnetic disk memory or a magnetic tape memory. The volatile memory may be a random access memory (RAM) that functions as an external cache. By way of example, but not limitation, many forms of RAM may be used, such as static random access memory (SRAM), synchronous static random access memory (SSRAM), dynamic random access memory (DRAM), synchronous dynamic random access memory (SDRAM), double data rate synchronous dynamic random access memory (DDRSDRAM), enhanced synchronous dynamic random access memory (ESDRAM), synclink dynamic random access memory (SLDRAM), direct ram-bus random access memory (DRRAM). The memories described in the embodiments of the present disclosure are intended to include, but are not limited to, these and any other suitable types of memories.

Some embodiments of the present disclosure are described above, which are not intended to limit the scope of protection of the present disclosure.

The invention claimed is:

1. An image reconstruction method, comprising:
   determining norms of convolution kernels of each convolutional layer of a deep neural network model;
   determining the convolution kernels with norms greater than or equal to a preset threshold in each convolutional layer to obtain a target convolution kernel set of each convolutional layer, wherein the target convolution kernel set of each convolutional layer comprises the convolution kernels with norms greater than or equal to the preset threshold;
   processing an input image of each convolutional layer by using the convolution kernels in the target convolution kernel set of each convolutional layer respectively, to obtain a first image processing result for the deep neural network model;
   obtaining a second image processing result by performing interpolation on an initial image; and
   determining a fusion result according to the first image processing result and the second image processing result and reconstructing the initial image according to the fusion result;
   wherein processing an input image of each convolutional layer by using the convolution kernels in the target convolution kernel set of each convolutional layer respectively comprises:
      processing the input image by using the convolution kernels with norms greater than or equal to the preset threshold in response to a difference between a maximum norm and a minimum norm of the convolution kernels in the target convolution kernel set of each convolutional layer respectively being within a preset range; and
      sorting the convolution kernels in a descending order of the norms in response to the difference between the maximum norm and minimum norm of the convolution kernels in the target convolution kernel set of each convolutional layer respectively not being within the preset range, and processing the input image by using first M convolution kernels in a sorting result, wherein M is a natural number greater than or equal to 1.

2. The image reconstruction method of claim 1, wherein the deep neural network model comprises N convolutional layers, and determining the convolution kernels with norms greater than or equal to a preset threshold in each convolutional layer to obtain a target convolution kernel set of each convolutional layer comprises:
   comparing the norms of the convolution kernels of an $i^{th}$ convolutional layer among the N convolutional layers with a preset threshold to determine the convolution kernels with norms greater than or equal to the preset threshold in the $i^{th}$ convolutional layer to obtain a first target convolution kernel subset of the $i^{th}$ convolutional layer; and
   comparing the norms of the convolution kernels of an $(i+1)$th convolutional layer among the N convolutional layers with a preset threshold to determine the convolution kernels with norms greater than or equal to the preset threshold in the $(i+1)^{th}$ convolutional layer to obtain a second target convolution kernel subset of the $(i+1)^{th}$ convolutional layer;
   wherein i is a natural number greater than 1 and less than N, and the $(i+1)^{th}$ convolutional layer represents a next convolutional layer to the $i^{th}$ convolutional layer.

3. The image reconstruction method of claim 2, wherein processing an input image of each convolutional layer by using the convolution kernels in the target convolution kernel set of each convolutional layer respectively, to obtain a first image processing result for the deep neural network model comprises:
   processing an input image of the $i^{th}$ convolutional layer by using the first target convolution kernel subset to obtain an image processing result of the $i^{th}$ convolutional layer;
   taking the image processing result of the $i^{th}$ convolutional layer as an input image of the $(i+1)^{th}$ convolutional layer;
   processing the input image of the $(i+1)^{th}$ convolutional layer by using the second target convolution kernel subset to obtain an image processing result of the $(i+1)^{th}$ convolutional layer; and
   taking the image processing result of the $N^{th}$ convolutional layer as the first image processing result, when $i+1=N$.

4. The image reconstruction method of claim 1, wherein determining a fusion result according to the first image processing result and the second image processing result comprises:
   determining weights corresponding to the first image processing result and the second image processing result, respectively; and
   determining a fusion result according to the first image processing result, the second image processing result, the weight corresponding to the first image processing result and the weight corresponding to the second image processing result.

5. The image reconstruction method of claim 4, wherein determining weights corresponding to the first image processing result and the second image processing result respectively comprises:
   determining the weight corresponding to the first image processing result according to a reliability coefficient of each convolutional layer; and
   determining the weight corresponding to the second image processing result according to the weight corresponding to the first image processing result.

6. The image reconstruction method of claim 5, further comprising:
   determining the reliability coefficient of each convolutional layer according to a formula of:

$$t_i = 1 - \frac{\sum\limits_{j=0:Q-\Omega} |f_{ij}(x)|}{\sum\limits_{j=0:Q} |f_{ij}(x)|}$$

where $t_i$ represents a reliability coefficient of the $i^{th}$ convolutional layer, $|f_{ij}(x)|$ represents the norm of the $j^{th}$ convolution kernel of the $i^{th}$ convolutional layer, $\Omega$ represents a set of the convolution kernels with norms greater than or equal to the preset threshold in the $j^{th}$ convolutional layer, and Q represents a set of all the convolution kernels in the $j^{th}$ convolutional layer.

7. The image reconstruction method of claim 1, wherein before determining norms of convolution kernels of each convolutional layer of a deep neural network model, the image reconstruction method further comprises:

selecting a deep neural network;

determining training parameters for the deep neural network according to an input image for training and an output image for training, by using the deep neural network; and obtaining the deep neural network model according to the training parameters, the input image for training and the output image for training to reconstruct an initial image according to the deep neural network model.

8. An image reconstruction device, comprising:
a first determination module, configured to determine norms of convolution kernels of each convolutional layer of a deep neural network model;
a second determination module, configured to determine the convolution kernels with norms greater than or equal to a preset threshold in each convolutional layer to obtain a target convolution kernel set of each convolutional layer, wherein the target convolution kernel set of each convolutional layer comprises the convolution kernels with norms greater than or equal to the preset threshold;
a processing module, configured to process an input image of each convolutional layer by using the convolution kernels in the target convolution kernel set of each convolutional layer respectively, to obtain a first image processing result for the deep neural network model;
an acquisition module, configured to obtain a second image processing result by performing interpolation on the initial image; and
a third determination module, configured to determine a fusion result according to the first image processing result and the second image processing result to reconstruct the initial image according to the fusion result;
wherein the processing module comprises:
a first processing unit, configured to process the input image by using the convolution kernels with norms greater than or equal to the preset threshold in response to the difference between the maximum norm and minimum norm of the convolution kernels in the target convolution kernel set of each convolutional layer respectively being within a preset range; and
a second processing unit, configured to sort the convolution kernels in a descending order of the norms in response to the difference between the maximum norm and minimum norm of the convolution kernels in the target convolution kernel set of each convolutional layer being not within the preset range and process the input image by using first M convolution kernels in a sorting result, wherein M is a natural number greater than or equal to 1.

9. The image reconstruction device of claim 8, wherein the deep neural network model comprises N convolutional layers, and the second determination module comprises:
a first determination unit, configured to compare the norms of the convolution kernels of the $i^{th}$ convolutional layer among the N convolutional layers with a preset threshold to determine the convolution kernels with norms greater than or equal to the preset threshold in the $i^{th}$ convolutional layer to obtain a first target convolution kernel subset of the $i^{th}$ convolutional layer; and
a second determination unit, configured to compare the norms of the convolution kernels of the $(i+1)^{th}$ convolutional layer among the N convolutional layers with a preset threshold to determine the convolution kernels with norms greater than or equal to the preset threshold in the $(i+1)^{th}$ convolutional layer to obtain a second target convolution kernel subset of the $(i+1)^{th}$ convolutional layer;
wherein i is a natural number greater than 1 and less than N, and the $(i+1)^{th}$ convolutional layer represents the next convolutional layer to the $i^{th}$ convolutional layer.

10. The image reconstruction device of claim 8, wherein the third determination module comprises:
a third determination unit, configured to respectively determine weights corresponding to the first image processing result and the second image processing result; and
a fourth determination unit, configured to determine a fusion result according to the first image processing result, the second image processing result, the weight corresponding to the first image processing result and the weight corresponding to the second image processing result.

11. The image reconstruction device of claim 10, wherein the third determination unit comprises:
a first determination subunit, configured to determine the weight corresponding to the first image processing result according to a reliability coefficient of each convolutional layer; and
a second determination subunit, configured to determine the weight corresponding to the second image processing result according to the weight corresponding to the first image processing result.

12. An image reconstruction apparatus, comprising a processor and a memory storing a computer program, wherein the computer program, when executed by the processor, causes the processor to perform the image reconstruction method comprising:
determining norms of convolution kernels of each convolutional layer of a deep neural network model;
determining the convolution kernels with norms greater than or equal to a preset threshold in each convolutional layer to obtain a target convolution kernel set of each convolutional layer, wherein the target convolution kernel set of each convolutional layer comprises the convolution kernels with norms greater than or equal to the preset threshold;
processing an input image of each convolutional layer by using the convolution kernels in the target convolution kernel set of each convolutional layer respectively, to obtain a first image processing result for the deep neural network model;
obtaining a second image processing result by performing interpolation on an initial image; and
determining a fusion result according to the first image processing result and the second image processing result and reconstructing the initial image according to the fusion result;
wherein processing an input image of each convolutional layer by using the convolution kernels in the target convolution kernel set of each convolutional layer respectively comprises:
processing the input image by using the convolution kernels with norms greater than or equal to the preset threshold in response to a difference between a maximum norm and a minimum norm of the convolution kernels in the target convolution kernel set of each convolutional layer respectively being within a preset range; and sorting the convolution kernels in a descending order of the norms in response to the difference between the maximum norm and minimum norm of the convolution kernels in the target convolution kernel set of each convolutional layer respectively not being within the preset range, and processing the input image by using first M convolution kernels in a sorting result, wherein M is a natural number greater than or equal to 1.

13. A non-transitory computer-readable storage medium storing a computer program which, when executed by a processor, causes the processor to perform the image reconstruction method comprising:

determining norms of convolution kernels of each convolutional layer of a deep neural network model;

determining the convolution kernels with norms greater than or equal to a preset threshold in each convolutional layer to obtain a target convolution kernel set of each convolutional layer, wherein the target convolution kernel set of each convolutional layer comprises the convolution kernels with norms greater than or equal to the preset threshold;

processing an input image of each convolutional layer by using the convolution kernels in the target convolution kernel set of each convolutional layer respectively, to obtain a first image processing result for the deep neural network model;

obtaining a second image processing result by performing interpolation on an initial image; and determining a fusion result according to the first image processing result and the second image processing result and reconstructing the initial image according to the fusion result;

wherein processing an input image of each convolutional layer by using the convolution kernels in the target convolution kernel set of each convolutional layer respectively comprises:

processing the input image by using the convolution kernels with norms greater than or equal to the preset threshold in response to a difference between a maximum norm and a minimum norm of the convolution kernels in the target convolution kernel set of each convolutional layer respectively being within a preset range; and sorting the convolution kernels in a descending order of the norms in response to the difference between the maximum norm and minimum norm of the convolution kernels in the target convolution kernel set of each convolutional layer respectively not being within the preset range, and processing the input image by using first M convolution kernels in a sorting result, wherein M is a natural number greater than or equal to 1.

* * * * *

UNITED STATES PATENT AND TRADEMARK OFFICE
CERTIFICATE OF CORRECTION

| | |
|---|---|
| PATENT NO. | : 11,810,265 B2 |
| APPLICATION NO. | : 17/299557 |
| DATED | : November 7, 2023 |
| INVENTOR(S) | : Dehui Kong et al. |

It is certified that error appears in the above-identified patent and that said Letters Patent is hereby corrected as shown below:

On the Title Page

The Left Column, Item (72), under "Inventors" reads:
"Dehui Kong, Shenzhen(CN); Ke Xu, Shenzhen (CN); Xiao Zhang, Shenzhen (CN); Bin Han, Shenzhen(CN); Zhou Han, Shenzhen(CN); Hong Wang, Shenzhen (CN); Guoning Lu, Shenzhen (GD); Long Huang, Shenzhen (CN); Sheng Luo, Shenzhen(CN)"

Should read:
"Dehui Kong, Shenzhen(CN); Ke Xu, Shenzhen (CN); Xiao Zhang, Shenzhen (CN); Bin Han, Shenzhen(CN); Zhou Han, Shenzhen(CN); Hong Wang, Shenzhen (CN); Guoning Lu, Shenzhen (CN); Long Huang, Shenzhen (CN); Sheng Luo, Shenzhen(CN)"

Signed and Sealed this
Fourth Day of June, 2024

Katherine Kelly Vidal
*Director of the United States Patent and Trademark Office*